United States Patent
McCauley et al.

(10) Patent No.: US 6,244,715 B1
(45) Date of Patent: Jun. 12, 2001

(54) MASS TRANSIT VEHICLE WINDOW GLARE-REDUCING ASSEMBLY

(75) Inventors: Alvin D. McCauley, Holly; Ben V. Domas, Oakland, both of MI (US)

(73) Assignee: Transmatic, Inc., Waterford, MI (US)

( * ) Notice: Subject to any disclaimer, the term of this patent is extended or adjusted under 35 U.S.C. 154(b) by 0 days.

(21) Appl. No.: 09/604,471

(22) Filed: Jun. 27, 2000

Related U.S. Application Data

(60) Provisional application No. 60/171,994, filed on Dec. 23, 1999.

(51) Int. Cl.[7] .................................................. G02B 21/00
(52) U.S. Cl. ........................ 359/601; 359/605; 359/609; 359/610; 359/613
(58) Field of Search .................................. 359/601, 605, 359/609, 610, 613; 362/217, 222, 260, 290, 291, 292, 125, 133, 351, 352, 74

(56) References Cited

U.S. PATENT DOCUMENTS

| | | |
|---|---|---|
| 2,099,451 | 11/1937 | Schepmoes . |
| 2,250,954 | 7/1941 | Hagerty et al. . |
| 2,299,276 | 10/1942 | Kirlin . |
| 2,466,223 | 4/1949 | Francis . |
| 2,579,015 | 12/1951 | Schoenbrod . |
| 3,833,804 | * 9/1974 | Vesely .................................. 240/125 |
| 3,885,150 | * 5/1975 | Ott ...................................... 240/46.39 |
| 4,630,181 | 12/1986 | Fain et al. . |
| 4,717,992 | 1/1988 | Bartenbach et al. . |
| 4,814,961 | * 3/1989 | O'Brien et al. ...................... 362/319 |
| 4,864,475 | * 9/1989 | Jung .................................... 362/231 |
| 5,117,342 | 5/1992 | Vlah . |
| 5,510,965 | 4/1996 | Teakell . |
| 5,526,241 | 6/1996 | Ferrell . |
| 5,806,972 | 9/1998 | Kaiser et al. . |
| 5,879,070 | 3/1999 | Severloh . |
| 5,892,621 | 4/1999 | McGregor et al. . |
| 5,895,114 | 4/1999 | Thorton . |
| 5,908,234 | 6/1999 | Kreeft . |

\* cited by examiner

*Primary Examiner*—Mohammad Sikder
(74) *Attorney, Agent, or Firm*—Reising, Ethington, Barnes, Kisselle, Learman & McCulloch, PC

(57) ABSTRACT

A windshield glare-reducing assembly includes a tubular sleeve configured to receive an elongated light source such as a fluorescent lamp. Louvers are supported along the sleeve so as to fit closely around such a lamp without touching or being mounted directly on the lamp. The louvers are shaped, spaced and positioned to reduce the amount of light emitted from the lamp towards a vehicle windshield and then reflecting from the windshield into the driver's eyes. The sleeve is shaped to allow the sleeve and louvers to be easily installed on and removed from a lamp and to ease replacement of burned-out and damaged lamps.

25 Claims, 6 Drawing Sheets

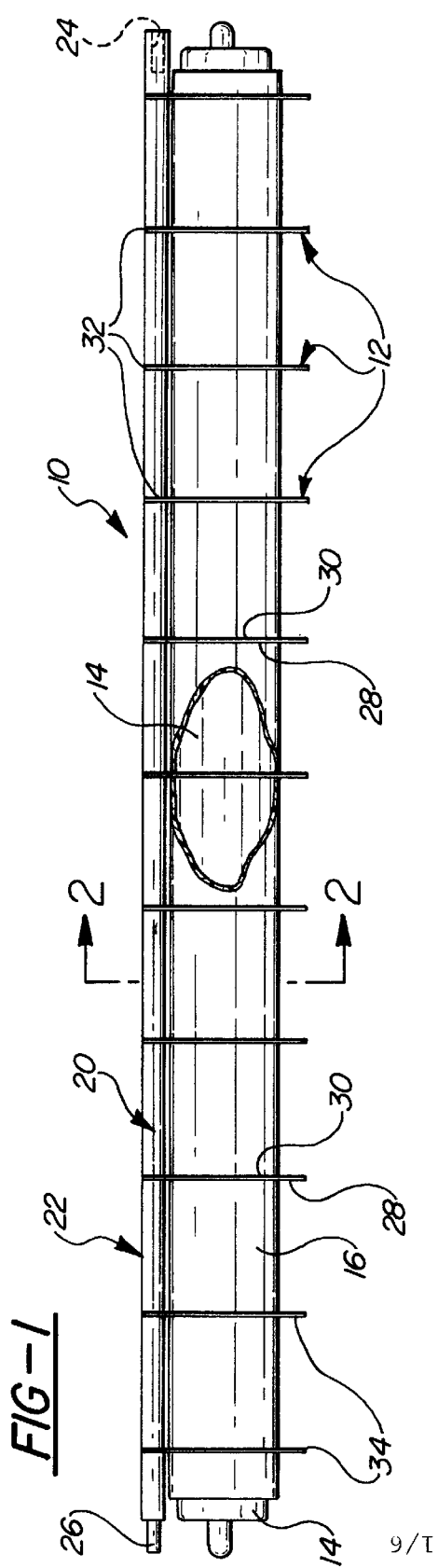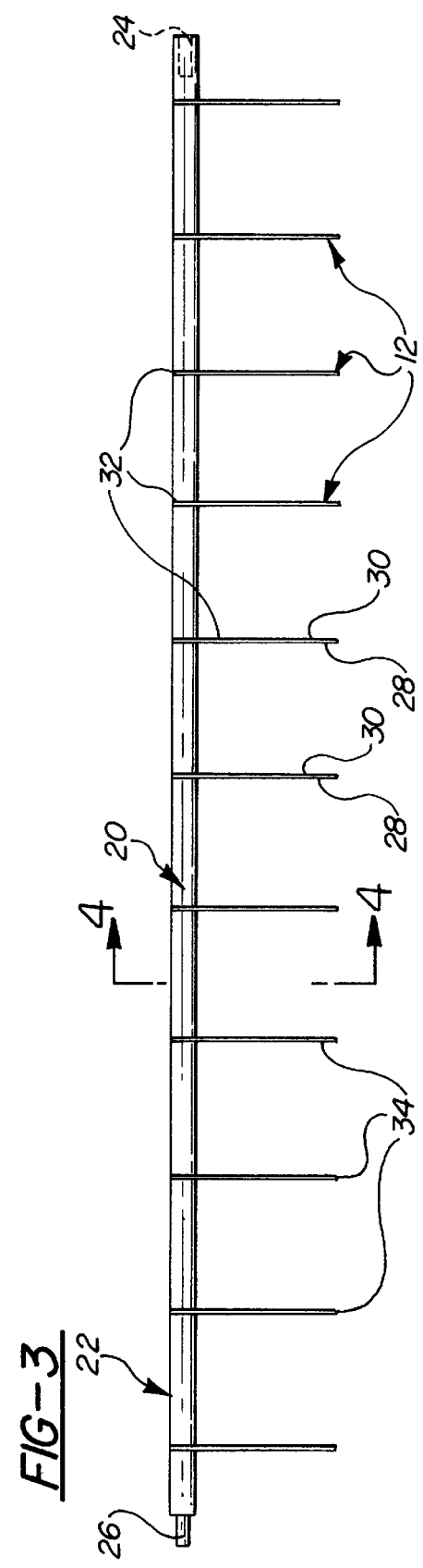

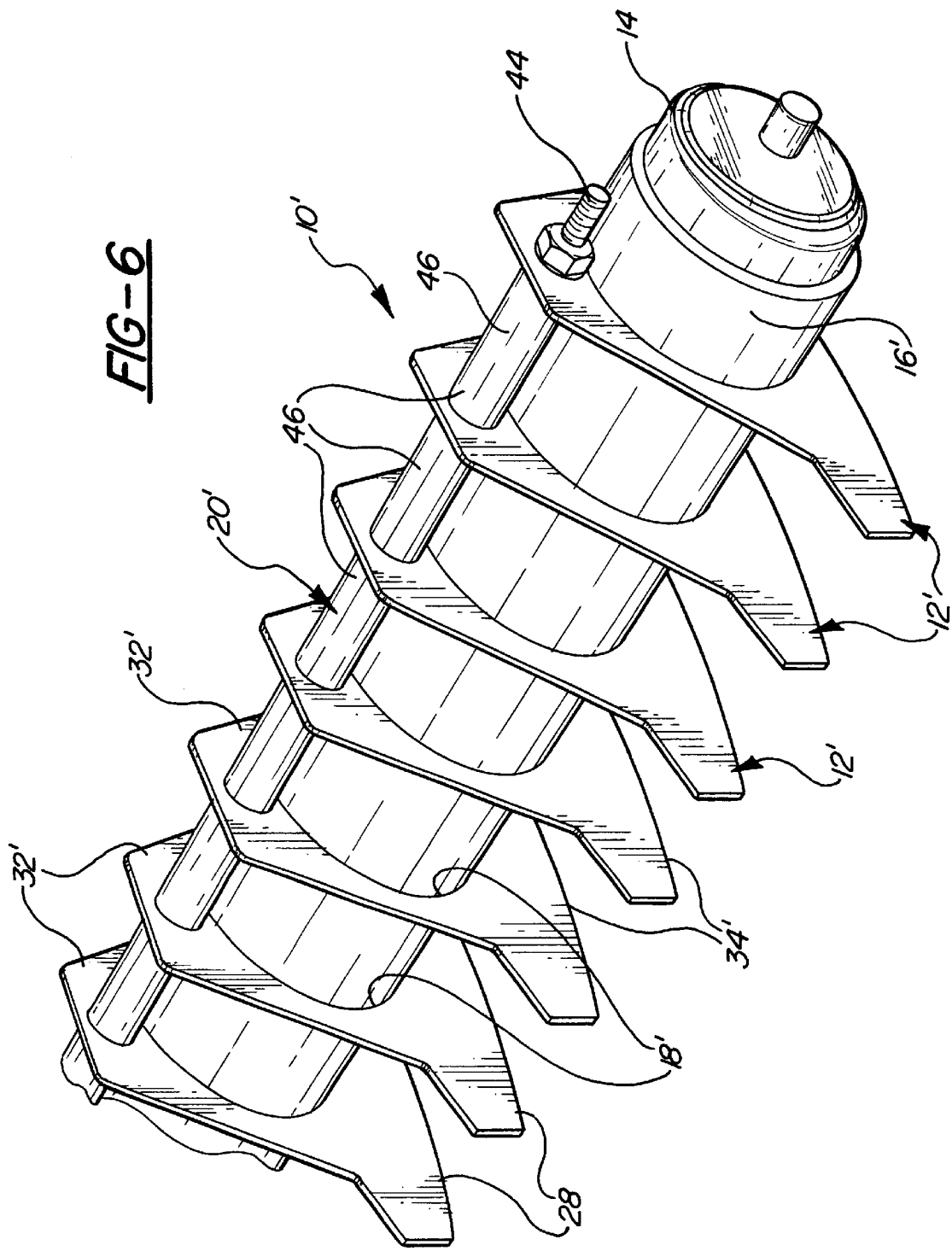

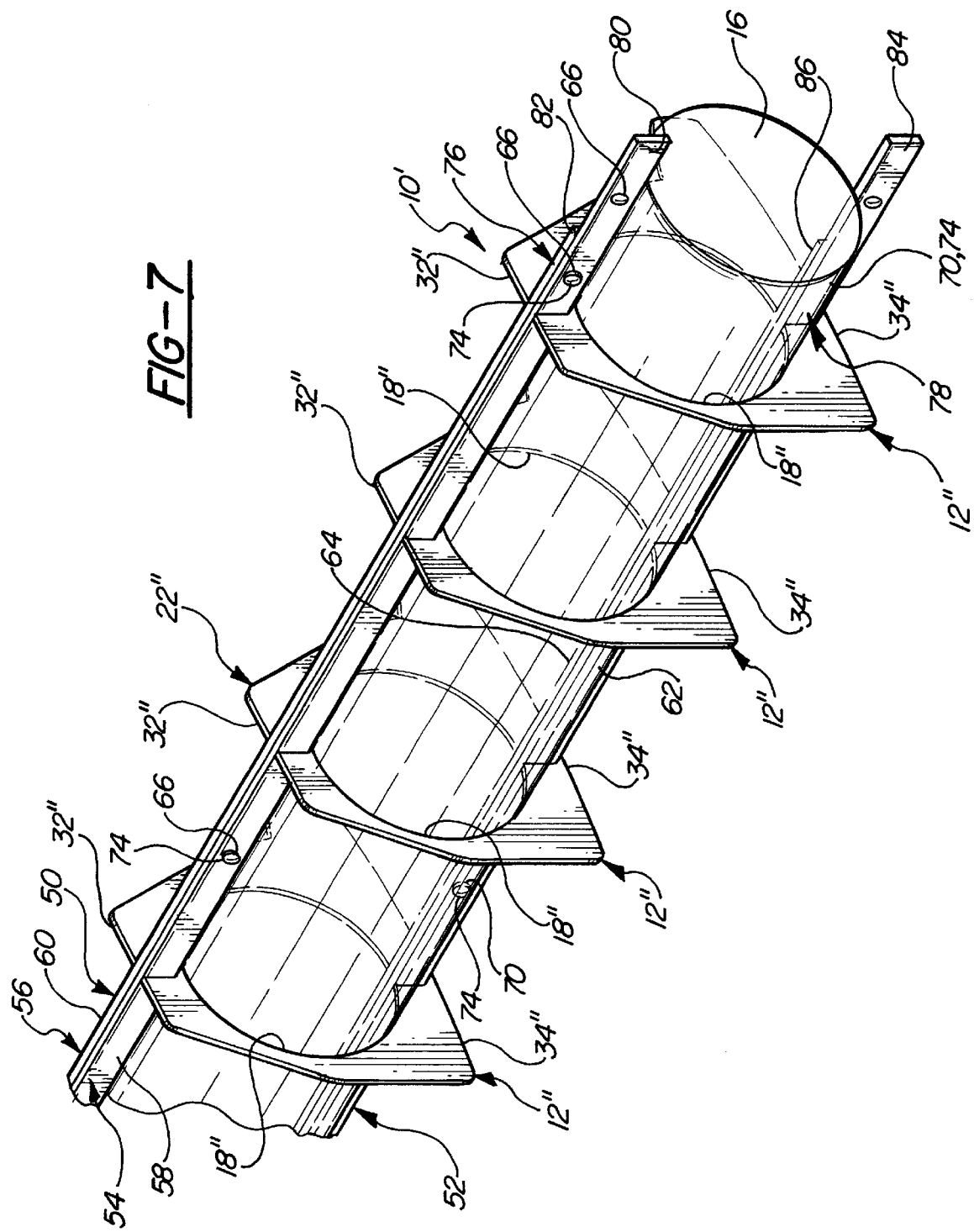

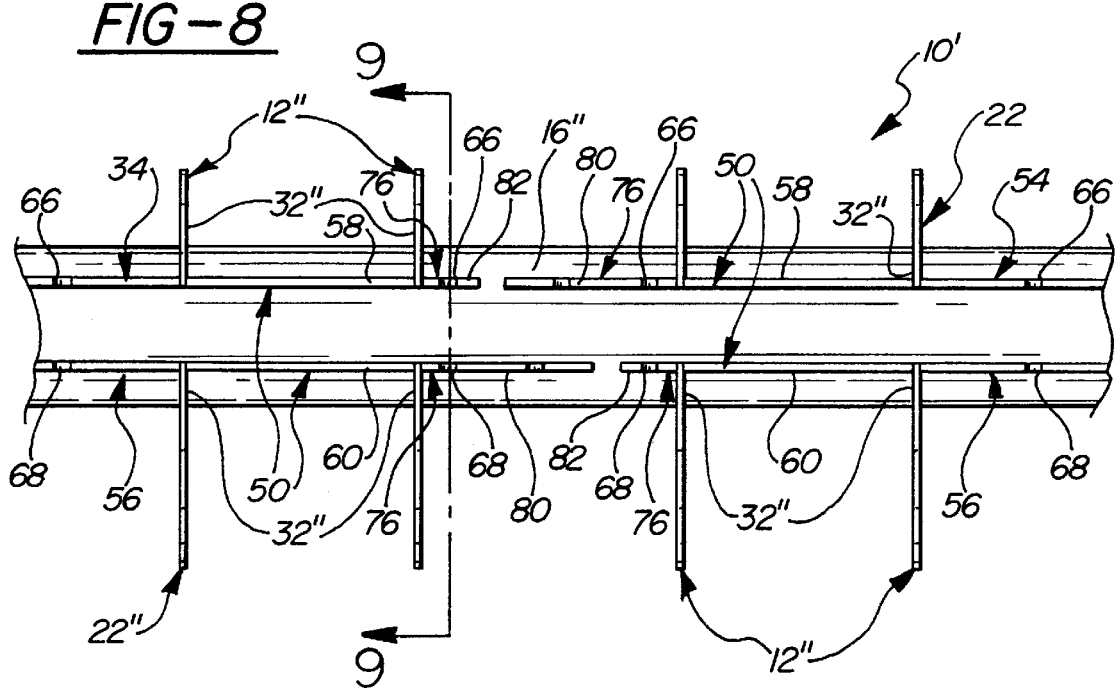
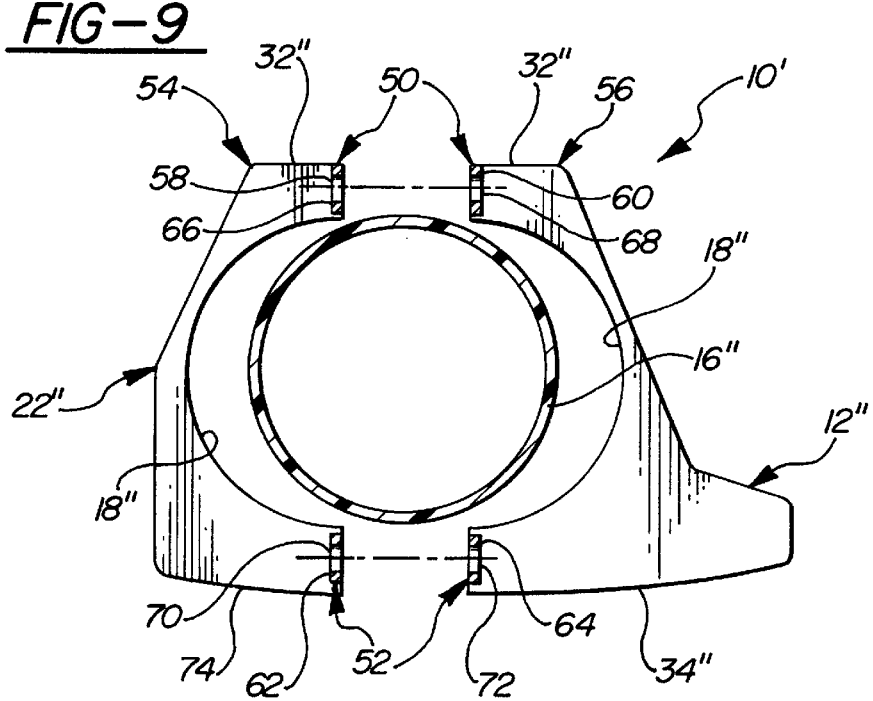

MASS TRANSIT VEHICLE WINDOW GLARE-REDUCING ASSEMBLY

This application claims priority of U.S. provisional patent application Ser. No. 60/171,994 filed Dec. 23, 1999.

TECHNICAL FIELD

This invention relates generally to a window glare-reducing assembly for reducing the amount of interior light reflected into a driver's eyes from the windshield of a mass transit vehicle as well as the amount of passenger-perceived glare reflected from side windows of a mass transit vehicle.

INVENTION BACKGROUND

Some mass transit vehicle interior lighting fixtures are known to include louvers or fins spaced axially along the length of an elongated cylindrical light source such as a fluorescent lamp. The louvers extend laterally from the lamps to direct light laterally into passenger seating areas and away from the windshield.

For example, U.S. Pat. No. 2,099,451, issued Nov. 16, 1937 to Schepmoes (the Schepmoes patent), discloses a lighting fixture intended for use in "railroad cars and the like" that includes a plurality of parallel louvers or fins spaced axially along the length of a fluorescent lamp. In addition, U.S. Pat. No. 4,717,992, issued Jan. 5, 1988 to Bartenbach et al. (the Bartenbach et al. patent), discloses a lighting fixture that includes a plurality of parallel louvers or fins spaced axially along the length of a fluorescent lamp. Each louver includes a circular hole sized to fit closely around the lamp.

U.S. Pat. No. 2,299,276 to Kirlin (the Kirlin patent) discloses racks of parallel louvers, each louver having a half-circular cutout sized to receive a fluorescent lamp. Each rack disclosed in the Kirlin patent includes a pair of C-shaped wire clips for clipping the louver racks onto the fluorescent lamp. In the louvers disclosed in the Shepmoes, Bartenbach et al. and Kirlin patents are configured to be supported directly on a fluorescent lamp.

What is needed is a window glare-reducing assembly that allows louvers to be mounted on and removed from an elongated cylindrical light source more quickly and easily.

INVENTION SUMMARY

According to the invention, a window glare-reducing assembly is provided for reducing the amount of glare reflected from a window of a mass transit vehicle by interior vehicle lighting. The assembly includes a first plurality of louvers configured to be supported in an axially spaced-apart disposition along the length of an elongated cylindrical light source. The window glare-reducing assembly also includes a tubular sleeve configured to receive an elongated cylindrical light source such as a fluorescent lamp. The first plurality of louvers is supported on the sleeve in an axially spaced-apart disposition. This allows each louver of the first plurality of louvers to fit closely around the cylindrical light source while simplifying installation and removal of the louvers and installation and replacement of cylindrical light sources that the louvers are supported on. Therefore, a window glare-reducing assembly constructed according to the invention is both easier to install and remove, and allows lamps to be replaced more easily.

According to another aspect of the invention, the sleeve comprises a plastic material, a transparent material and/or a colored material. The color and transparency of the sleeve material may be selected by a customer to complement existing interior color schemes, to control light dispersion, to affect passenger moods and/or to cause passengers to associate a certain color with the particular transport company that uses it.

According to another aspect of the invention, a support shaft is connected to each louver of the first plurality of louvers. The support shaft holds the louvers together making them easier to install on and remove from the tube. The support shaft also serves to stabilize the relative positions and attitudes of the louvers connected to it.

According to another aspect of the invention, the first plurality of louvers and the first support shaft are integrally formed as a single unitary piece. Forming the louvers and shaft as a single unitary piece eliminates the need to manufacture and assembly multiple parts.

According to another aspect of the invention, the assembly includes at least one additional plurality of louvers configured to be supported in an axially spaced-apart disposition along the length of an elongated cylindrical light source and a second support shaft connected to each louver of the additional plurality of louvers. The first support shaft is configured to interconnect with the second support shaft in an end-to-end disposition. Shorter lengths of louvered shafts are easy to manufacture and can easily be assembled end-to-end to cover whatever length of fluorescent tube is being used in a particular lighting fixture.

According to another aspect of the invention, one of the first and second support shafts includes an axial counter bore at one end. The other of first and second support shafts includes a complementary axially extending post at one end configured to be received into the axial counter bore. This pin-and-socket arrangement maintains alignment between adjacent lengths of louvered shafts providing aesthetically pleasing visual continuity.

According to another aspect of the invention, each louver includes a circular through-hole. The circular through holes are configured and coaxially aligned to receive the tubular sleeve. The holes allow the louvers to extend completely around the circumference of the lamp they are supported on thereby directing a maximum amount of light emitted from the host lamp.

According to another aspect of the invention, the louvers comprise non-reflective surfaces to further reduce non-lateral light emissions by absorbing rather than reflecting light.

According to another aspect of the invention, the louvers comprise translucent material to reduce the magnitude and harshness of non-lateral light emissions.

According to another aspect of the invention, the louvers comprise colored material to complement existing interior color schemes, to control light dispersion, to affect passenger moods and/or to cause passengers to associate a certain color with the particular transport company that uses it.

According to another aspect of the invention, the louvers are disposed parallel to each other to direct light evenly along the length of the vehicle.

According to another aspect of the invention, the louvers are disposed perpendicular to the support shaft to direct light exclusively in a lateral direction relative to the lamp.

According to another aspect of the invention, the louvers are angled relative to the support shaft and lamp to direct light toward a predetermined portion of the passenger compartment or away from a predetermined portion of the passenger compartment.

According to another aspect of the invention, the louvers are spaced apart by a distance that provides an interior illumination level of 15 foot-candles at each reading plane at each seat location within a vehicle to be illuminated, where the entire length of each elongated cylindrical light source mounted within the vehicle is disposed within the assembly and a plurality of like assemblies having identically spaced louvers. (Each reading plane is defined as a one square foot plane inclined at a 45 degree angle 33" above a floor of the vehicle and 22" in front of a seat back of one of the seats.) This insures that the lighting system meets minimum industry standards for mass transit vehicle interior lighting.

According to another aspect of the invention, each louver includes an inside edge configured to conform generally to the interior contours of a lamp housing in an interior light fixture. The conforming inside edge prevents light from escaping between the inside edge and the lamp housing and provides maximum louver surface area for light deflection.

According to another aspect of the invention, each louver includes an outside edge configured to conform generally to the interior contours of an interior light fixture lens. The conforming outside edge provides a maximum louver surface area for light deflection within the confines of the lens.

According to another aspect of the invention, the louvers are black in color to increase light absorption and to minimize light reflection.

The invention also includes a method for making a window glare-reducing assembly. The method includes molding the louvers and support shaft are together as a single unitary piece. The sleeve is then inserted through the circular through-holes of the louvers and an elongated cylindrical light source is provided within the sleeve. The light source, sleeve, louvers, and shaft are provided in the light fixture such that the light source is electrically connected to a light source power supply of the light fixture and is physically supported by light source receptacles of the light fixture. The method further includes providing a lens on the light fixture. This method greatly simplifies the process of assembling louvers to a lamp.

According to another aspect of the inventive method, the step of molding the louvers and support shaft together as a single unitary piece includes providing a mold including a mold cavity having an interior shape complementing the exterior shape of the louvers and support shaft. The mold also includes a pair of frusto-conical tapered rods configured to be inserted into the mold cavity from axially opposite ends of the mold and to form the circular through-holes of the louvers. The tapered rods are then inserted into the mold cavity from axially opposite ends of the mold and molten material is provided in the mold cavity. The molten material is allowed to harden, the tapered rods are withdrawn, the mold is opened and the finished product is removed. The use of tapered rods allows the rods to be removed easily and without binding within the circular apertures that the rods form in the louvers.

According to another aspect of the invention, a support shaft interconnects the first plurality of louvers to form a louver assembly. The louver assembly is split longitudinally to form interconnectable first and second louver assembly portions. This allows the louver assembly to be closed or assembled around the tubular sleeve rather than forcing the tubular sleeve through the louvers one louver at a time.

According to another aspect of the invention, the louver assembly includes a second support shaft. The incorporation of the second support shaft insures that the individual louvers will remain parallel to each other.

According to another aspect of the invention a method is provided for making a windshield glare-reducing assembly that includes molding interconnectable first and second louver assembly portions as separate pieces then interconnecting the louver assembly portions around the tubular sleeve such that the individual louvers of the louver assembly are supported in an axially spaced-apart disposition along the sleeve.

DRAWING DESCRIPTIONS

These and other invention features and advantages will become apparent to those skilled in the art when considered along with the following detailed description and drawings, in which:

FIG. 1 is a front view of a window glare-reducing assembly constructed according to the invention with a fluorescent lamp disposed within a transparent sleeve of the invention and with the sleeve partially cut away to expose a fluorescent lamp beneath;

FIG. 3 is a front view of the glare-reducing assembly of FIG. 1 with the fluorescent lamp and transparent sleeve removed to show only a louver assembly of the glare-reducing assembly of FIG. 1;

FIG. 6 is a partial perspective view of the sleeve of FIG. 1 disposed around a fluorescent lamp and within a louver assembly constructed according to a second embodiment of the invention;

FIG. 7 is a partial perspective view of the sleeve of FIG. 1 disposed within a louver assembly constructed according to a third embodiment of the invention;

FIG. 8 is a top view of the louver assembly and sleeve of FIG. 7 with first and second portions of the louver assembly shown split apart; and FIG. 9 is a cross-sectional side view of the louver assembly and sleeve of FIG. 7 taken along line 9—9 of FIG. 8.

DETAILED DESCRIPTION

Figure 4:
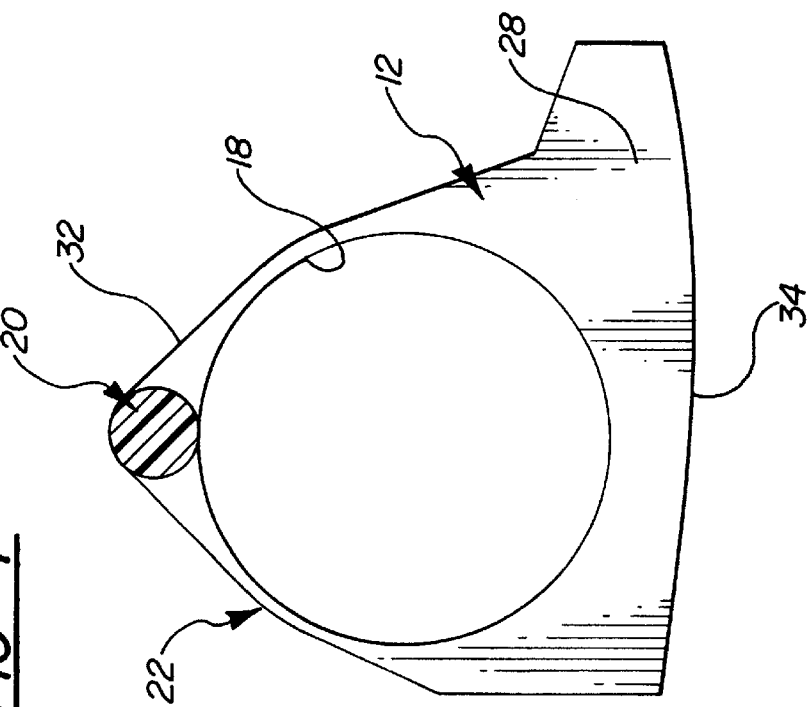
FIG. 4 is a cross-sectional side view of the louver assembly of FIG. 3 taken along line 4—4 of FIG. 3.
Figure 2:
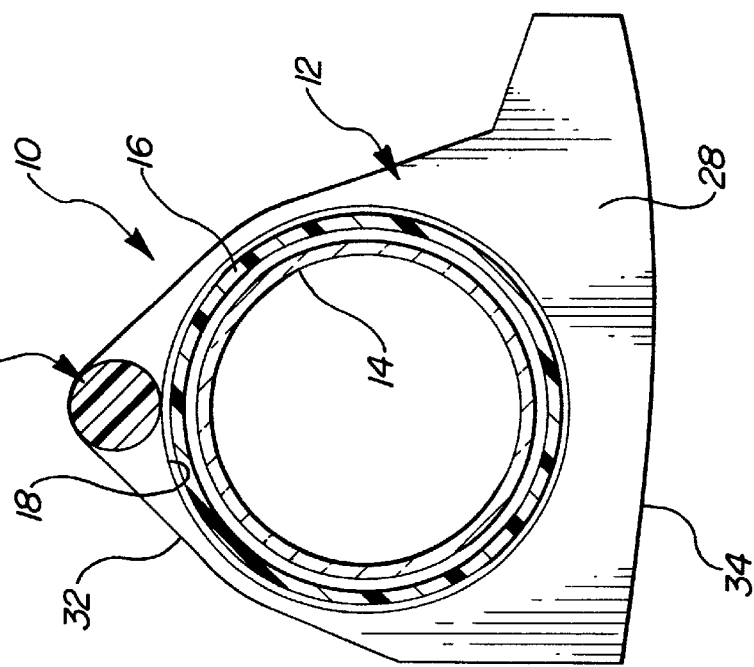
FIG. 2 is a cross-sectional side view of the glare-reducing assembly and fluorescent lamp of FIG. 1 taken along line 2—2 of FIG. 1.
Figure 5:
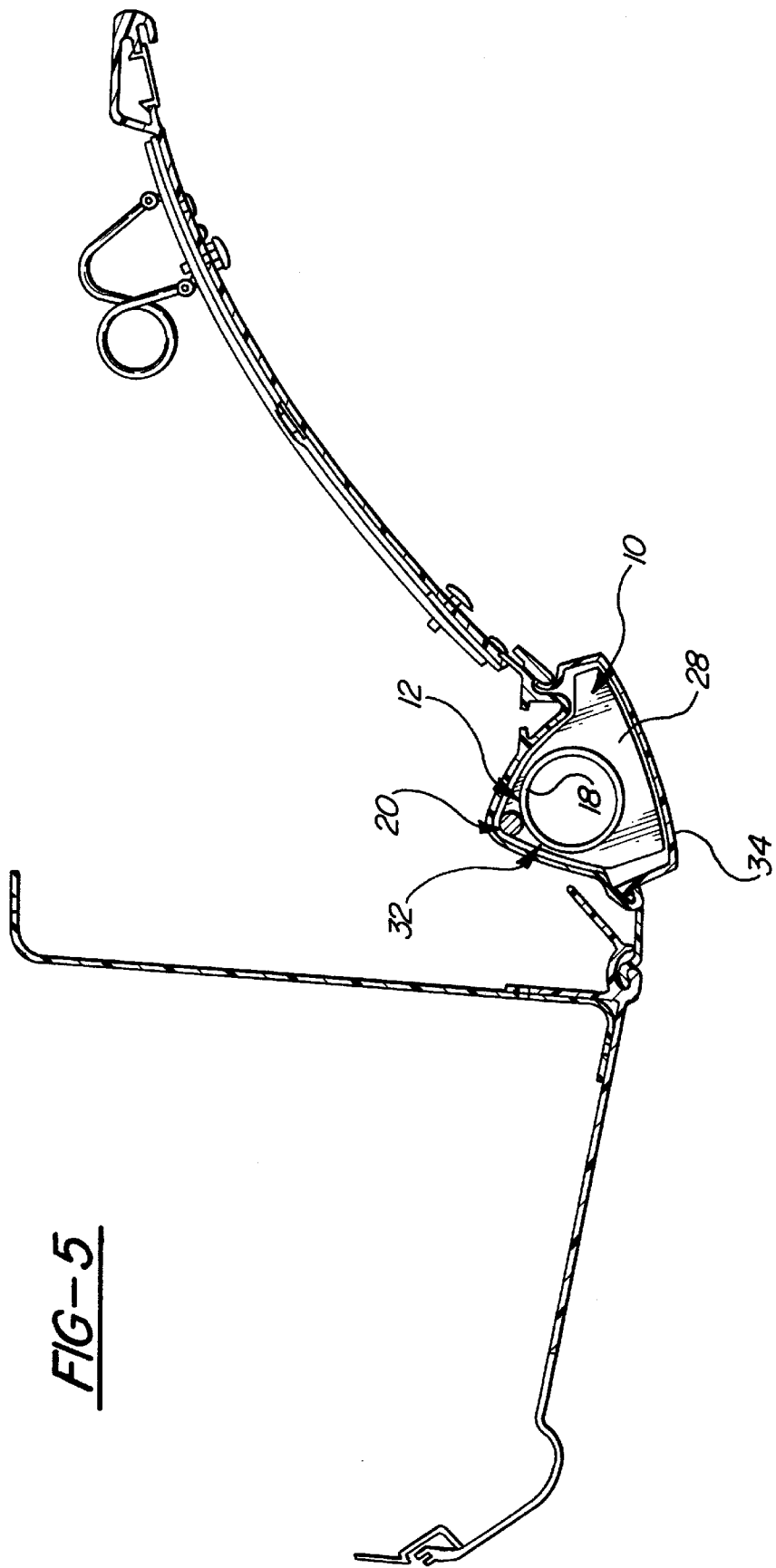
FIG. 5 is a cross sectional front view of a window glare-reducing assembly constructed according to the invention and installed in a lighting fixture.

A first embodiment of a window glare-reducing assembly for reducing the amount of driver-perceived glare reflected from the windshield of a mass transit vehicle and the amount of passenger-perceived glare reflected from side windows by interior vehicle lighting is generally indicated at 10 in FIGS. 1, 2 and 5. Second and third embodiments are generally indicated at 10' in FIG. 6 and 10" in FIGS. 7–9. Reference numerals with the prime (') designation in FIG. 6 and the double prime (") designation in FIGS. 7–9 indicate alternative configurations of elements that also appear in the first embodiment. Unless indicated otherwise, where a portion of the following description uses a reference numeral to refer to the FIGS., we intend that portion of the description to apply equally to elements designated by primed numerals in FIG. 6 and double-primed numerals in FIGS. 7–9.

The glare-reducing assembly 10 includes a plurality of louvers generally indicated at 12 in FIGS. 1–5. The louvers 12 are configured to be supported in an axially spaced-apart disposition along the length of an elongated cylindrical light source such as a fluorescent lamp 14. The glare-reducing assembly 10 also includes a tubular sleeve 16 configured to receive or slide over an elongated cylindrical light source 14. Each louver 12 includes a circular through-hole 18. The circular through-holes 18 are configured and coaxially aligned to receive the tubular sleeve 16. The louvers 12 are supported on the sleeve 16 in an axially spaced-apart disposition along the length of the sleeve 16.

The sleeve 16 comprises a transparent plastic material that may be either clear or colored, depending primarily on considerations as aesthetics and transport company identification for advertising and promotional purposes. However, in other embodiments, color choice may also be influenced by functional considerations. For example, it would be desirable to use red colored material in applications (such as law enforcement or military operations) where it is important for passengers to retain or acquire increased night vision capability.

The louvers 12 are connected to and integrally formed with an elongated cylindrical support shaft 20 as a single unitary louver assembly 22. The louvers 12 and support shaft 20 are formed from a polycarbonate material by a molding process described below. However, in other embodiments louvers 12 may be post-applied to a preformed sleeve 16 either by gluing, fasteners, clips or by interference fit. In other embodiments, the louvers 12 and support shaft 20 may also be made of a material other than a polycarbonate material. Each louver assembly 22 in the present embodiment is molded to a length of approximately two feet as measured from one end of the support shaft 20 to the other. Several of the louver assemblies 22 are installed end-to-end in longer light fixtures. The number of louver assemblies 22 installed in each light fixture depends on the length of fluorescent lamps used in a light fixture.

The support shaft 20 of each louver assembly 22 is configured to interconnect with the support shafts 20 of adjacent louver assemblies in an end-to-end disposition. As shown in FIGS. 1 and 3, one end of each support shaft 20 includes an axial counter bore 24. As is also shown in FIGS. 1 and 3, the other end of each support shaft 20 includes a complementary axially-extending post 26 configured to be received and glued into the axial counter bore 24 of an adjacent louver assembly 22. In other embodiments, the louver assembly 22 may be formed or assembled to extend the full length of each fluorescent lamp 14.

The louvers 12 and support shaft 20 are opaque, black in color, and comprise non-reflective front and back surfaces 28, 30. However, in other embodiments the louvers 12 may comprise colored material coordinated with the sleeve color and/or interior colors of the vehicle they will be installed in. The louvers 12 may also alternatively comprise translucent material As is best shown in FIG. 3, the louvers 12 are disposed parallel to each other and perpendicular to the support shaft 20 and the fluorescent lamp 14 they are supported on, primarily to prevent light from shining directly from the fluorescent lamp 14 onto a vehicle windshield then reflecting into a driver's eyes. However, in other embodiments the louvers 12 may be cast or attached at an angle other than perpendicular or at varying angles, depending on their position in the vehicle, to direct light into various desired locations.

The louvers 12 of each louver assembly 22 are preferably spaced apart by a distance that provides an interior illumination level of 15 foot-candles at each reading plane at each seat location within a vehicle to be illuminated. This assumes that the entire length of each elongated cylindrical light source 14 mounted within the vehicle is disposed within the assembly and a plurality of like louver assemblies having identically spaced louvers 12. Each reading plane is defined as a one square foot plane inclined at a 45 degree angle 33" above a floor of the vehicle and 22" in front of a seat back of one of the seats. The 15 foot-candle illumination standard described above is a minimum requirement established by the American Public Transit Association (APTA). See *Passenger Interior Lighting*, STANDARD BUS PROCUREMENT GUIDELINES, Section 5.4.4.6; April, 1999. The object is to provide minimum interior lighting levels while complying with the APTA standard. The approximate 2-inch spacing of the louvers 12 shown in the drawings and photographs met the above standard almost exactly in one bus. However, the optimum louver spacing is likely to differ from vehicle to vehicle.

To minimize axial light leakage and to maximize the area of the louver surfaces 28, 30 within the confines of a lamp housing, an inside edge 32 of each louver 12 is shaped to conform generally to the interior contours of a lamp housing in an interior light fixture as shown in FIG. 5. Similarly, an outside edge 34 of each louver 12 is shaped to conform generally to the interior contours of an interior light fixture lens that fits over and closes the lamp housing. By conforming the inside and outside edges 32, 34 of each louver 12 to the respective interior contours of the lamp housing and the lens, each louver 12 is formed to include a maximum surface area for directing light emitted from the lamp 14 they are mounted on.

Each windshield glare-reducing assembly 10 is made by first molding louvers 12 and a support shaft 20 together as a single unitary piece. This includes providing a mold 36 including a mold cavity 38 having a shape complementary to that of the louvers 12 and support shaft 20. The mold 36 also includes a pair of frusto-conically tapered rods 40 configured to be inserted into the mold cavity 38 from axially opposite ends of the mold 36 and to form the circular through-holes 18 of the louvers 12. The tapered rods 40 are then inserted into the mold cavity 38 from axially opposite ends of the mold 36. Molten material 42 is then provided in the mold cavity 38 and is allowed to harden. The tapered rods 40 are then withdrawn, the mold 36 is opened and the louver assembly 22 is removed. The sleeve 16 is then inserted through the axially aligned circular through-holes 18 of the louvers 12. A fluorescent lamp 14 is then slid into the sleeve 16 and the lamp 14, sleeve 16 and louver assembly 22 are installed in a light fixture by installing the lamp 14 in lamp receptacles formed in the light fixture such that the light source 14 is electrically connected to a light source power supply of the light fixture. Finally, the lens is fastened over the lamp housing.

The rods 40 are tapered to provide an approximate 2-degree draft to prevent the rods 40 from sticking within the circular through-holes 18 after the molten polycarbonate has hardened. To minimize the resulting difference circular through-hole diameters along the length of each louver assembly 22, the length of each louver assembly 22 is limited to approximately 2 feet and two, rather than one, taper rods 40 are used.

The window glare-reducing assembly 10 may be configured for installation in new light fixtures and shipped with the fixtures from the factory. The glare-reducing assembly 10 may alternatively be configured for retrofitting into the lamp housings of existing light fixtures.

Supporting the louvers 12 on a tube as described above allows the louvers 12 to be formed to fit closely around the cylindrical light source 14 while simplifying louver installation and removal. Closer fitting louvers 12 more efficiently direct light emitted from the lamp 14 in the desired lateral direction and minimize axial dispersion. Louver installation and removal are simplified because the sleeve 16 is disposed in the circular through-holes 18 to act as an interface between the louvers 12 and the fluorescent lamp 14 the louvers 12 are supported on. The sleeve 16 allows lamps 14 to be quickly and easily installed and replaced within the through-holes 18 because it maintains the holes 18 in axial alignment and guides lamps through the holes 18.

In other embodiments, such as the embodiment shown in FIG. 6, the louvers 12' may be connected together by a small diameter metal rod 44 and spaced apart by plastic spacers 46. In such an embodiment spacers 46 of varying lengths may be used to produce a glare-reducing assembly 10' especially suited to a particular application. This type of embodiment also lends itself well to experimentation required to determine optimum louver spacing in a particular application. The spacers 46 may all be of the same length as shown in FIG. 6, or may be graduated in size along the length of a light fixture. Once the optimum uniform or graduated spacing has been determined, the lower cost injection molding method described above may then be used to mass-produce assemblies having the optimum spacing.

According to the third embodiment shown in FIGS. 7–9, the louvers 12" are interconnected by upper and lower elongated support shafts 50, 52 to form a louver assembly 22". The louver assembly 22" is split longitudinally to form interconnectable first and second louver assembly portions 54, 56. The upper and lower support shafts 50, 52 are connected to each louver 12" at respective diametrically opposite locations relative to the circular through-hole 18" in each louver 12" and adjacent respective upper and lower edges 32", 34" of each louver 12".

The upper support shaft 50 is rectangular in cross section and is split vertically and longitudinally to form interconnectable first and second elongated upper support shaft portions 58, 60. Likewise, the lower support shaft 52 is rectangular in cross-section and is split vertically and longitudinally to form interconnectable first and second elongated lower support shaft portions 62, 64. The upper and lower support shaft portions 58, 60; 62, 64 are interconnectable along their respective lengths to form the respective upper and lower support shafts 50, 52 and to interconnect the first and second louver assembly portions 54, 56 forming the first louver assembly 22".

The first and second upper support shaft portions 58, 60 include fastener holes 66, 68 at corresponding spaced-apart locations along their respective lengths. As best shown in FIGS. 8 and 9, the fastener holes 66 of the first upper support shaft portion 58 are coaxially aligned with the fastener holes 68 of the second upper support shaft portion 60. Likewise, as is best shown in FIG. 9, the first and second lower support shaft portions 62, 64 include fastener holes 70, 72 at corresponding spaced-apart locations along their respective lengths. The fastener holes 70 of the first lower support shaft portion 62 are coaxially aligned with the fastener holes 72 of the second lower support shaft portion 64. As shown in FIG. 7, rivets 74 or other suitable fasteners are disposed in the aligned holes 66, 68; 70, 72 of the upper and lower support shaft portions 58, 60; 62, 64 and hold the first and second portions of the upper and lower support shafts 50, 52 together around the tubular sleeve 16".

The louver assembly 22" is configured to connect end-to-end with adjacent identical louver assemblies as shown in FIG. 8. The window glare reducing assembly includes as many of these interconnectable louver assemblies 22" as are required to cover whatever length tubular light source is required for a particular application.

As best shown in FIGS. 7 and 8, the first and second portions 58, 60 of the upper support shaft 50 of each louver assembly 22" are longitudinally offset from each other. As is also best shown in FIGS. 7 and 8, the first and second portions 62, 64 of the lower support shaft 52 of each louver assembly 22" are longitudinally offset from each other. Consequently, at each end of each louver assembly 22", upper and lower support shaft end sections 76, 78 that extend from endmost louvers 12" of each louver assembly 22", each include first and second end section portions 80, 82; 84, 86 that differ in length. In other words, one end section 80, 84 of the each support shaft portion of each louver assembly 22" extends farther than does the corresponding end section 82, 86 of the mating support shaft portion.

As shown in FIG. 8, the longer end sections 80, 84 of the upper and lower support shafts 50, 52 of one louver assembly 22" are configured to overlap and connect via rivets or other suitable fasteners to the longer end sections 80, 84 of the upper and lower support shafts 50, 52 of an adjacent louver assembly 22" while abutting the shorter end sections 82, 86 of the upper and lower support shafts 50, 52 of the adjacent louver assembly 22".

In practice, a windshield glare-reducing assembly constructed according to the third embodiment shown in FIGS. 7–9 can be assembled by first molding the interconnectable first and second louver assembly portions 54, 56 as separate pieces. The first and second louver assembly portions 54, 56 are then interconnected around the tubular sleeve 16" such that the individual louvers 12" of the louver assembly 22" are supported in an axially spaced-apart disposition along the sleeve 16". A fluorescent bulb or other suitable elongated cylindrical light source is then slid into the sleeve 16". The fluorescent bulb and surrounding tubular sleeve 16" and louver assembly 22" are then installed in the light fixture by plugging axially opposite ends of the fluorescent bulb 16" into respective bulb sockets in a light fixture.

This description is intended to illustrate certain embodiments of the invention rather than to limit the invention. Therefore, it includes descriptive rather than limiting words.

Obviously, it's possible to modify this invention from what the description teaches and one may practice the invention other than as described.

What is claimed is:

1. A windshield glare-reducing assembly for reducing the amount of driver-perceived glare reflected from the windshield of a mass transit vehicle by interior vehicle lighting, the assembly comprising:

a tubular sleeve configured to be slid over and supported directly on and along the length of an elongated cylindrical light source; and a first plurality of louvers supported on the sleeve in an axially spaced-apart disposition to allow each louver of the first plurality of louvers to fit closely around the cylindrical light source and to allow the light source to support the sleeve and louvers as the light source is installed in a light fixture thus simplifying installation and removal of the louvers and installation and replacement of cylindrical light sources that the louvers are supported on.

2. A windshield glare-reducing assembly as defined in claim 1 in which the sleeve comprises a plastic material.

3. A windshield glare-reducing assembly as defined in claim 1 in which the sleeve comprises a transparent material.

4. A windshield glare-reducing assembly as defined in claim 1 in which the sleeve comprises a colored material.

5. A windshield glare-reducing assembly as defined in claim 1 in which a first support shaft is connected to each louver of the first plurality of louvers.

6. A windshield glare-reducing assembly as defined in claim 5 in which the first plurality of louvers and the first support shaft are integrally formed as a single unitary piece.

7. A windshield glare-reducing assembly as defined in claim 5 in which the assembly includes:
   a second plurality of louvers configured to be supported in an axially spaced-apart disposition along the length of an elongated cylindrical light source; and
   a second support shaft connected to each louver of the second plurality of louvers, the first support shaft being configured to interconnect with the second support shaft in an end-to-end disposition.

8. A windshield glare-reducing assembly as defined in claim 7 in which:
   one of the first and second support shafts includes an axial counter bore at one end; and
   the other of first and second support shafts includes a complementary axially extending post at one end configured to be received into the axial counter bore.

9. A windshield glare-reducing assembly as defined in claim 1 in which each louver includes a circular through-hole, the circular through holes being configured and coaxially aligned.

10. A windshield glare-reducing assembly as defined in claim 1 in which the louvers comprise non-reflective surfaces.

11. A windshield glare-reducing assembly as defined in claim 1 in which the louvers comprise translucent material.

12. A windshield glare-reducing assembly as defined in claim 1 in which the louvers comprise colored material.

13. A windshield glare-reducing assembly as defined in claim 1 in which the louvers are disposed parallel to each other.

14. A windshield glare-reducing assembly as defined in claim 13 in which the louvers are disposed perpendicular to the support shaft.

15. A windshield glare-reducing assembly as defined in claim 1 in which the louvers are angled relative to the support shaft and lamp.

16. A windshield glare-reducing assembly as defined in claim 1 in which the louvers are spaced apart by a distance that provides an interior illumination level of approximately 15 foot-candles at each reading plane at each seat location within a vehicle to be illuminated, each reading plane being defined as a one square foot plane inclined at a 45 degree angle 33" above a floor of the vehicle and 22" in front of a seat back of a seat mounted in the vehicle.

17. A windshield glare-reducing assembly as defined in claim 1 in which each louver includes an inside edge configured to conform generally to the interior contours of a lamp housing in an interior light fixture.

18. A windshield glare-reducing assembly as defined in claim 1 in which each louver includes an outside edge configured to conform generally to the interior contours of an interior light fixture lens.

19. A windshield glare-reducing assembly as defined in claim 1 in which the louvers comprise a polycarbonate material.

20. A windshield glare-reducing assembly as defined in claim 1 in which the louvers are black in color.

21. A windshield glare-reducing assembly as defined in claim 1 in which:
   a support shaft interconnects the first plurality of louvers to form a first louver assembly; and
   the first louver assembly is split longitudinally to form interconnectable first and second louver assembly portions.

22. A windshield glare-reducing assembly as defined in claim 21 in which:
   the louvers are interconnected by upper and lower elongated support shafts to form the first louver assembly;
   the upper support shaft is split longitudinally to form interconnectable first and second elongated upper support shaft portions; and
   the lower support shaft is split longitudinally to form interconnectable first and second elongated lower support shaft portions, the upper and lower support shaft portions being interconnectable along their respective lengths to form the respective upper and lower support shafts and to interconnect the first and second louver assembly portions forming the first louver assembly.

23. A windshield glare-reducing assembly as defined in claim 22 in which:
   the first and second upper support shaft portions include fastener holes at corresponding spaced-apart locations along their respective lengths, the fastener holes of the first upper support shaft portion being coaxially aligned with the fastener holes of the second upper support shaft portion;
   the first and second lower support shaft portions include fastener holes at corresponding spaced-apart locations along their respective lengths, the fastener holes of the first lower support shaft portion being coaxially aligned with the fastener holes of the second lower support shaft portion;
   fasteners are disposed in the through the aligned holes of the upper and lower support shaft portions and hold the first and second portions of the upper and lower support shafts together.

24. A windshield glare-reducing assembly as defined in claim 23 in which the assembly includes a second louver assembly generally identical to the first louver assembly and configured to connect to the first louver assembly in an end-to-end disposition.

25. A windshield glare-reducing assembly as defined in claim 24 in which:
   respective end sections of the first portions of the respective upper and lower support shafts of the first louver assembly are longer than respective end sections of the second portions of the respective upper and lower support shafts of the first louver assembly;
   respective end sections of the first portions of the respective upper and lower support shafts of the second louver assembly are longer than respective end sections of the second portions of the respective upper and lower support shafts of the second louver assembly; and
   the longer end sections of the upper and lower support shafts of the first louver assembly are configured to overlap and connect to the longer end sections of the upper and lower support shafts of the second louver assembly.

* * * * *